US006967661B2

(12) United States Patent
Lin

(10) Patent No.: US 6,967,661 B2
(45) Date of Patent: Nov. 22, 2005

(54) COMPUTER SYSTEM WHICH SCANS LINES IN TILED BLOCKS OF A DISPLAY AREA

(75) Inventor: Jiing Lin, Hsin-Tien (TW)

(73) Assignee: VIA Technologies Inc., Hsin-Tien (TW)

( * ) Notice: Subject to any disclaimer, the term of this patent is extended or adjusted under 35 U.S.C. 154(b) by 98 days.

(21) Appl. No.: 10/249,954

(22) Filed: May 22, 2003

(65) Prior Publication Data

US 2003/0222878 A1 Dec. 4, 2003

(30) Foreign Application Priority Data

May 23, 2002 (TW) .............................. 91110957 A

(51) Int. Cl.[7] ................................................ G06T 1/60
(52) U.S. Cl. ...................................... 345/531; 345/536
(58) Field of Search ............................. 345/87, 90, 98, 345/100, 103, 536, 537, 501, 530, 531

(56) References Cited

U.S. PATENT DOCUMENTS 5,712,652 A * 1/1998 Sato et al. .................... 345/98
2002/0047826 A1 * 4/2002 Akimoto et al. ............ 345/100

* cited by examiner

*Primary Examiner*—Kee M. Tung
(74) *Attorney, Agent, or Firm*—Winston Hsu

(57) ABSTRACT

A computer system includes a monitor, a memory and a processing unit. The monitor includes a main area for displaying an image. The main area has a plurality of rows and a plurality of columns of tiles. Each tile has a plurality of rows and a plurality of columns of display units, and each display unit is for displaying a portion of the image according to corresponding pixel data. The memory includes a plurality of first sequential memory units and a plurality of second sequential memory units. The first sequential memory units are for storing pixel data of a first tile. The second sequential memory units are for storing pixel data of a second tile. The second tile is horizontally next to the first tile. The processing unit sequentially transmits pixel data of pixels in the first tile before transmitting pixel data of pixels in the second tile.

11 Claims, 10 Drawing Sheets

COMPUTER SYSTEM WHICH SCANS LINES IN TILED BLOCKS OF A DISPLAY AREA

BACKGROUND OF INVENTION

1. Field of the Invention

The present invention relates to a computer system, and more particularly, to a computer system for dividing a display area into a plurality of tiles and displaying images by a basic unit of a tile.

2. Description of the Prior Art

Monitor is one of the most important human-computer interfaces of computer systems. Monitor can display important information, numerical data, and graphic images to users. More and more monitors have graphical user interfaces (GUI) to enable users to easily and intuitively operate the computer system. With the recent development of information technology, more and more information is graphically expressed. For instance, computer aided design (CAD) software, and video-communication with remote networks all demand better monitors. Therefore, monitors and related devices of computer systems are important topics of modern information technology research and development.

Please refer to FIG. 1, which is a functional block diagram of a prior art computer system 10. The computer system 10 comprises a CPU 12, a northbridge circuit 14A, a southbridge circuit 14B, peripheral devices 14C, a graphics card 16, and a monitor 20. The monitor 20 displays images in a main display area 22. The CPU 12 is to control the operations of the computer system 10. The northbridge circuit 14A is to control data flow between the CPU 12 and the graphics card 16, while the southbridge circuit 14B is to control data flow between the CPU 12 and peripheral devices 14C through the intermediate northbridge circuit 14A. The peripheral devices 14C can be input devices (keyboard, mouse, etc) and storage devices (CD-ROM, HDD, etc). After digital data is processed by the CPU 12, the processed digital data is then transferred to the graphics card 16 to graphically display on the monitor 20. The graphics card 16 comprises a processing unit 18A and a memory 18B. Of course, chipset developers have variations of this such as the processing unit 18A being integrated into the northbridge 14A, and the memory 18B incorporated with system memory in the computer system 10.

In the monitor 20, the main display area 22 comprises display units A disposed in a plurality of columns and rows arranged as a matrix, and a controller 24 to control these display units A. As is shown in FIG. 1, a plurality of display units arranged from left to right can be classified as a row. An uppermost row in FIG. 1 is marked as row Rp(0), and a second uppermost row is marked as row Rp(1), and so on. If the main display area 22 comprises M rows, then the lowest row of FIG. 1 can be marked as Rp(M−1). When the main display area 22 displays an image, each display unit A displays a part of the image according to corresponding pixel data. Composing all that display units A display can generate a complete image. To control the contents of the main display area 22, the memory 18B comprises a plurality of memory units D, and each of the memory units D corresponds to a display unit A and stores pixel data. When the computer system 10 is going to display an image on the main display area 22, it temporarily stores the data of the images into the memory 18B, and then the processing circuit 18A reads the data from each memory unit D of the memory 18B. Then the data is image-processed to obtain the corresponding pixel data. Finally, the obtained pixel data is written back to each memory unit D of the memory 18B. Then the plurality of pixel data composing the image is transmitted to the controller 24 through the processing circuit 18A sequentially. In the prior art monitor 20, when the controller 24 receives the sequential pixel data it controls each display unit A according to the pixel data to display the image on the main display area 22.

To further illustrate how the controller 24 works, please refer to FIG. 2A. FIG. 2A is a schematic diagram of a controlling sequence of the display units A in the prior art monitor 20. To clearly illustrate the sequence of the controller 24 controlling all the display units A, the bracketed number of each display unit A represents its own position in the sequence. As is shown in FIG. 2A, the controller 24 makes the display units A display the image according to the corresponding pixel data. For example, the first pixel data in the sequence controls the display unit A(0), and the second pixel data in the sequence controls the display unit A(1) until N display units of the row Rp(0) sequentially displays images. Then the controller 24 controls the next row according to the next N pixel data. This continues row by row, until finally the A((M−2)*N) display unit to the A((M−1)*N−1) display unit of the row Rp(M−2) and the A((M−1)*N) display unit to the A(M*N−1) display unit of the row Rp(M−1) to finish the controlling of M*N display units of the main display area 22. According to the manner of row-by-row and following the sequence of N display units A in each row, the controller 24 can control the corresponding display units A to display the sequential pixel data.

As is mentioned above, the processing circuit 18A of the graphics card 16 shares responsibility with the CPU 12 to generate pixel data before processing images besides sequentially transmitting pixel data to the controller 24. From the point view of image processing, the pixel data of adjacent display units in the main display area 22 have more relevance and can be regarded as one entity. In general cases, adjacent display units have similar colors and brightness. For example, in the field of computer graphics (CG), anti-aliasing gives intermediate colors and brightness to pixels in border regions of a portion of the image having too sharp a contrast. The pixel data of adjacent display units have more relevance during image processing. In order to efficiently execute image processing, grouping adjacent display units into a tile as a unit for image processing is adopted. Please refer to FIG. 2B. FIG. 2B is a schematic diagram of adjacent display units forming basic tiles for image processing. As is shown in FIG. 2A, in FIG. 2B each display unit A shows its position in sequence by a bracketed number. Assuming that a tile is formed by Mt rows and Nt columns of adjacent display units, the status of the main display area 22 after tiling is shown in FIG. 2B. The main display area 22 is divided into (M*N)/(Mt*Nt) tiles. A first tile can be marked as tile Tp(0), which consists of display units of a first Nt columns of rows Rp(0) to Rp (Mt−1). A second tile can be marked as tile Tp(1), which consists of display units of a second Nt columns of rows Rp(0) to Rp(Mt−1). The display units of the second tile Tp(1) includes display units A (Nt) to A(2Nt−1) in row Rp(0) and display units A((Mt−1)*N+Nt) to A ((Mt−1)*N+2Nt−1)) in row Rp(Mt−1). A last tile can be marked as tile Tp((M*N)/(Mt*Nt)−1), which consists of display units of a last Nt columns of rows Rp(M−Mt) to Rp(M−1). The display units of the tile Tp((M*N)/(Mt*Nt)−1) includes display units A((M−Mt+1)*N−Nt) to A((M−Mt+1)*N−1) in row Rp(M−Mt), and display units A(M*N−Nt) to A(M*N−1) in row Rp(M−1).

As is discussed formerly, the processing circuit 18A of the computer system 10 accesses the pixel data of the memory 18B for image processing, then transmits the pixel data one by one to the controller 24. The controller 24 can then make the display units A display the image in the same sequence shown in the FIG. 2A. Since the memory units D of the memory 18B are for storing corresponding pixel data of the display units A, an allocation type of each memory unit D affects the efficiency of the processing unit 18A when accessing the memory 18B. Please refer to FIG. 3A. FIG. 3A is a schematic diagram of the allocation type of each memory unit D when the memory 18B is under a linear address mode. To mark the display unit A corresponding to the memory unit D, each memory unit D in FIG. 3 has a number of its corresponding display unit A shown in brackets. In other words, the data stored in the memory unit D(m) is the pixel data of the display unit marked as A(m). As is shown in FIG. 3A, the linear address mode of the memory 18B is to store the N pixel data of the same row into adjacent memory units. For example, N display units A(0) to A(N−1) of the row Rp(0) have the corresponding N pixel data stored in the sequential N memory units D(0) to D(N−1) of the memory 18B, and similarly, the N display units of the row Rp(1) have the corresponding N pixel data stored in the following N sequential memory units D(N) to D(2N−1) of the memory 18B. Finally, the N display units of the row Rp(M−1) store their pixel data in the N sequential memory units starting from the memory unit D((M−1)*N) to D(M*N−1). When the processing circuit 18A of the graphics card 16 is transferring the pixel data to the controller 24 by the linear address mode in the FIG. 3, the controller 24 controls the display of images in the sequence of display units A(0), A(1) and so on. Then the processing unit 18A can directly and sequentially transmit data starting with the memory unit D(0) to the controller 24, in order to display the image on the main display area 22.

Though the linear address mode of the memory 18B in FIG. 3A can conveniently to directly transmit pixel data sequentially to the controller 24 of the monitor 20, however, when the processing circuit 18A is going to perform image processing, access efficiency of the memory 18B is deteriorated. Please refer to FIG. 3B, which is a schematic diagram of the memory 18B being accessed while the processing circuit 18A is performing image processing. As is illustrated and discussed with reference to FIG. 2B, dividing the display units A into tiles is better for the processing circuit 18A executing image processing. However, the linear address mode of FIG. 2B stores pixel data into memory units D under a linear address mode, if the processing unit 18A is going to access the related information of a tile, it must discontinuously access the memory units D because a tile is composed of a plurality of columns and rows. The operation of discontinuously accessing results in page misses, and each page miss causes penalties in latency. Therefore, though the linear address mode allows transmitting pixel data to the controller 24 by sequentially access, it results in a low processing efficiency because of the discontinuous accessing of a tile pixel data when executing image processing.

In contrast to the linear address modes of FIG. 3A and FIG. 3B, there is another type of memory allocation, called "tiled mode". Please refer to FIG. 4A and FIG. 4B. FIG. 4A and FIG. 4B are schematic diagrams of pixel data being transmitted and image processing being performed in tiled mode, wherein each memory unit D is for storing the pixel data of the each display unit A. Under the tiled mode, all display units in the same tile have their corresponding pixel data stored sequentially into adjacent memory units. As is shown in FIG. 4A, Mt*Nt sets of pixel data corresponding to Mt*Nt display units (Mt rows, each row having Nt columns) of the tile Tp(0) are stored sequentially in the adjacent Mt*Nt memory units of the memory 18B. In the same way, Mt*Nt sets of pixel data of the tile Tp(1), comprising from the display units A(Nt) to A(2Nt−1) corresponding to the row Rp(0) to the display units A((Mt−1)*N+Nt) to A((Mt−1)*N+2Nt−1) corresponding to the row Rp(Mt−1), are stored sequentially into the adjacent Mt*Nt memory units of the memory 18B. Finally, Mt*Nt sets of pixel data of the tile Tp(M*N/(Mt*Nt)−1) are stored in the last continuous Mt*Nt memory units.

As is shown in the FIG. 4A, when executing image processing and in tiled mode, the processing circuit 18A can continuously access the pixel data instead of discontinuously crossing several memory pages to access all the pixel data of a tile. However, as is shown in FIG. 4B, when the processing circuit 18A is to transmit the pixel data sequentially to the controller 24 for displaying the image, the controller 24 makes the display units display the image in the sequence of the row numbers, which is illustrated in the FIG. 2A. Therefore, the processing circuit 18A must access the pixel data in the memory 18B and transmit them to the controller 24 in the same sequence. For example, when the processing circuit 18A transmits N pixel data of the row Rp(0) to the controller 24, it must read Nt sets of pixel data of the tile Tp(0) from the first Mt*Nt memory units, then cross to the following Mt*Nt memory units to read another Nt sets of pixel data of the row Rp(0) of the tile Tp(1). Similarly, the processing circuit 18A reads the last Nt sets of pixel data of the row Rp(0) from the Mt*Nt memory units of the tile Tp(N/Nt−1). The processing circuit 18A can collect the complete pixel data of the row Rp(0) by the above mentioned method, and then transmit them to the controller 24 for the display units of the row Rp(0) thereby displaying the image sequentially.

To sum up the above discussion it can be concluded that when under the linear address mode shown in FIG. 3A and FIG. 3B, the processing circuit 24 can sequentially read from the memory 18B and transmit the data sequentially to the controller 24. However, when the processing circuit 18A is processing the image, it must discontinuously access the pixel data instead of continuously accessing the pixel data when under the tiled mode, which is shown in FIG. 4A and FIG. 4B. The method has such a drawback that when the processing circuit 18A is transmitting pixel data to the controller 24, it must discontinuously access the memory units D of the memory 18B in the same sequence of the controller 24 controlling the display units A. This degrades access efficiency.

When under the linear address mode and the processing circuit 18A is accessing the corresponding pixel data, each time processing circuit 18A accesses 32*32 sets of pixel data of a tile, the processing circuit 18A needs to access pixel data scattered over 32 rows. Since a memory page has two rows of pixel data stored therein, collecting a tile of pixel data causes 16 page misses. As the main display area has 24*32 tiles, 12288 (16*24*32) page misses occur in order to access all the pixel data of the main display area 22. When the processing circuit 18A reads the data in the memory 18B and sequentially transmits the data to the controller 24, 384 (768/2) page misses will occur since a page has two rows of pixel data, and the main display area has 768 rows. The above-mentioned problem is illustrated in FIG. 3A.

When in the tiled mode and the processing circuit 18A is accessing the corresponding pixel data, since a page has two tiles of pixel data and the main display area has 24*32 tiles, then 384 (24*32/2) page misses occur, which is shown in FIG. 4A. As is shown in FIG. 4B, when the processing circuit 18A sequentially transmits the pixel data of each row to the controller 24, the processing circuit 18A crosses 32 tiles to completely collect a row of 1024 sets of pixel data. As each page has two tiles of pixel data, and the main display area has 768 rows, then 12288 (768*32/2) page misses occur.

The above-mentioned information shows that in the prior art monitor 20, the controller 24 can only accept pixel data transmitted sequentially to correctly control the outputted image of each display unit A. However, when processing an image, tiled allocation of memory is more efficient. Therefore, there is a trade-off between the linear address mode and the tiled mode.

Furthermore, the monitor 20 needs to refresh the screen at a specific refresh frequency, and each refreshing requires transmitting and processing of the pixel data of all display units A in the main display area 22. The more memory page misses that occur, the more is demanded from the graphics card 16. High demand to the graphics card 16 generates excessive heat and heat sinks are required on chips of the graphics card 16, which makes the design of the graphics card 16 more complicated and of higher cost.

SUMMARY OF INVENTION

It is therefore a primary objective of the claimed invention to provide a computer system to overcome the prior art disadvantages.

Briefly summarized, the computer system includes a monitor having a main display area for displaying an image, the main display area having a plurality of display units arranged to be a matrix with a plurality of columns and rows. Each display unit displays a portion of the image according to a corresponding pixel data, and a part of the display units utilized in a tile are arranged to be a matrix-style tile with the numbers of rows and columns both smaller than the numbers of rows and columns of the main display area. The computer system further includes a memory with of a plurality of first sequential memory units and a plurality of second sequential memory units, the second memory unit for storing pixel data of a display unit in the tile while the first memory unit is for storing pixel data of display units not in the tile. No first memory unit is utilized between any two second memory units. The computer system further includes a processing unit for sequentially transmitting pixel data stored in any memory unit of the memory. The processing unit does not transmit any pixel data stored in the first memory unit between transmitting the two pixel data of the second memory unit when the processing unit is transmitting two pixel data of two adjacent memory units respectively.

According to the claimed invention, the monitor further includes a controller electrically connected with the processing unit for transmitting the pixel data from the processing unit to the corresponding display unit. The controller can transmit a plurality of pixel data of the second memory unit to the display units of the tile to make the plurality of display units display the corresponding image.

It is an advantage of the claimed invention that the controller controls the display units tile by tile and therefore the display controlling and the image processing are all in the same mode. This decreases the resources needed by the computer system by a large margin and accordingly reduces the cost of the computer system, the graphics card, and production without degrading the display quality.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
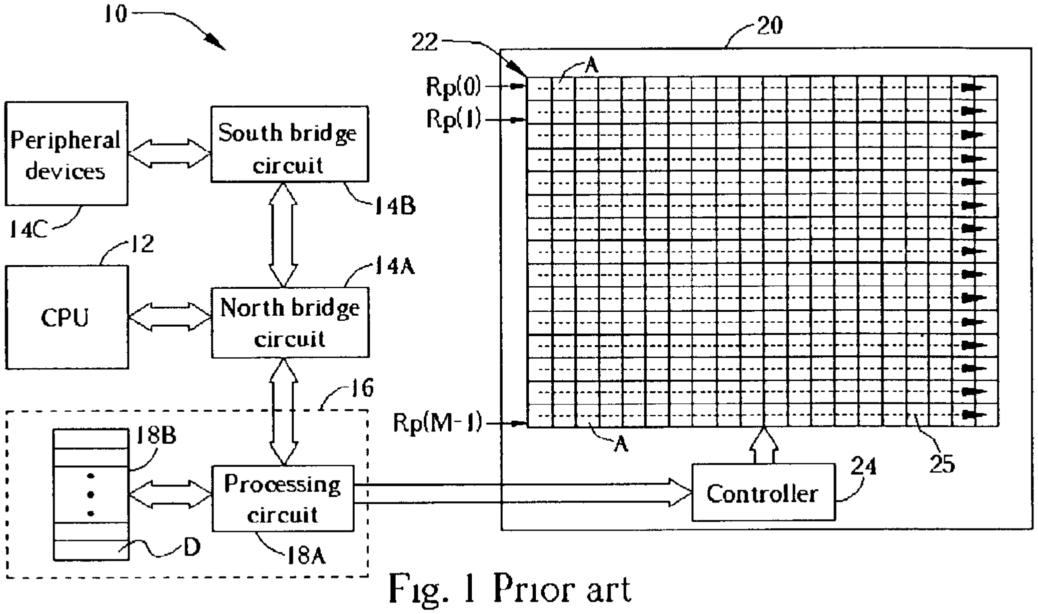
Fig. 1 Prior art
FIG. 1 is a functional block diagram of a prior art computer system.
Figure 2A:
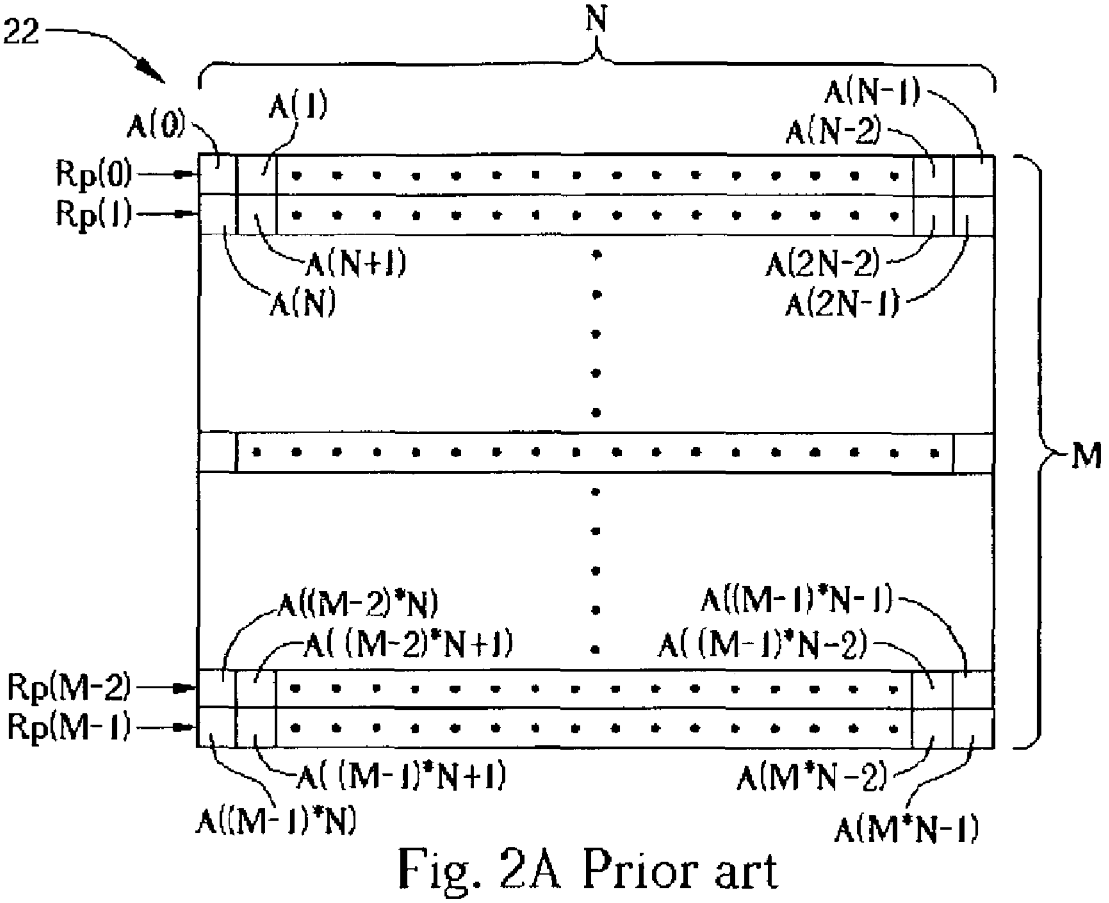
Fig. 2A Prior art
FIG. 2A is a schematic diagram of sequences of the monitor in FIG. 1 controlling display units.
Figure 2B:
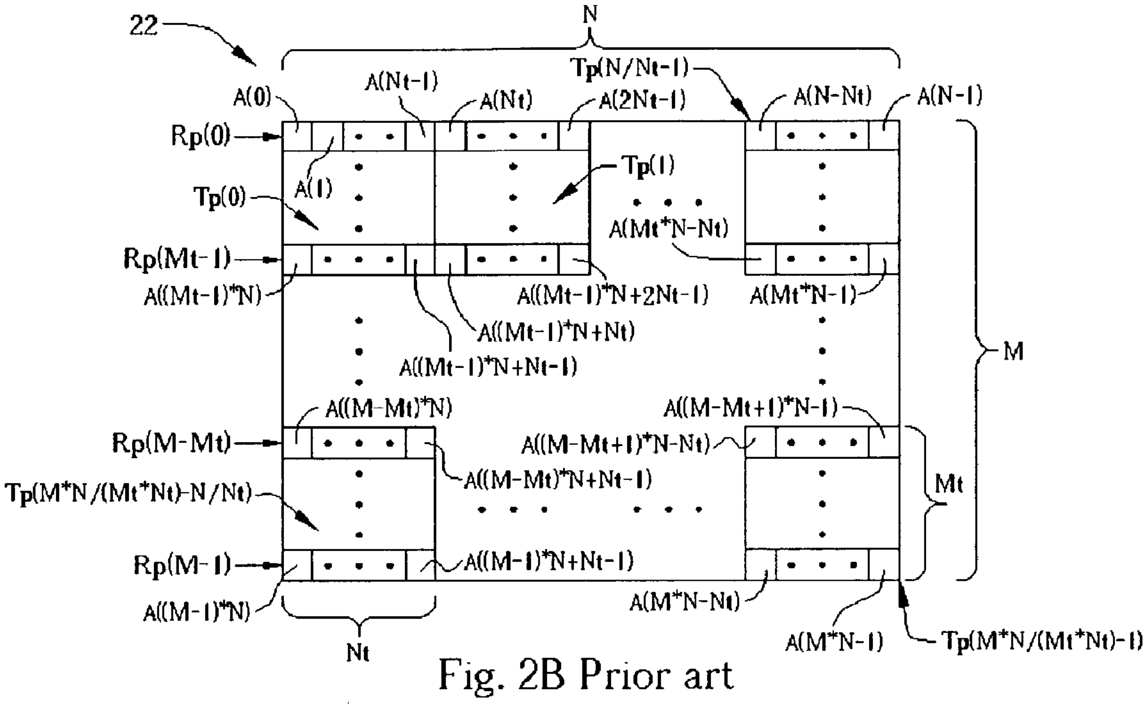
Fig. 2B Prior art
FIG. 2B is a schematic diagram of tiles when image processing is in progress according to the prior art.
Figure 3A:
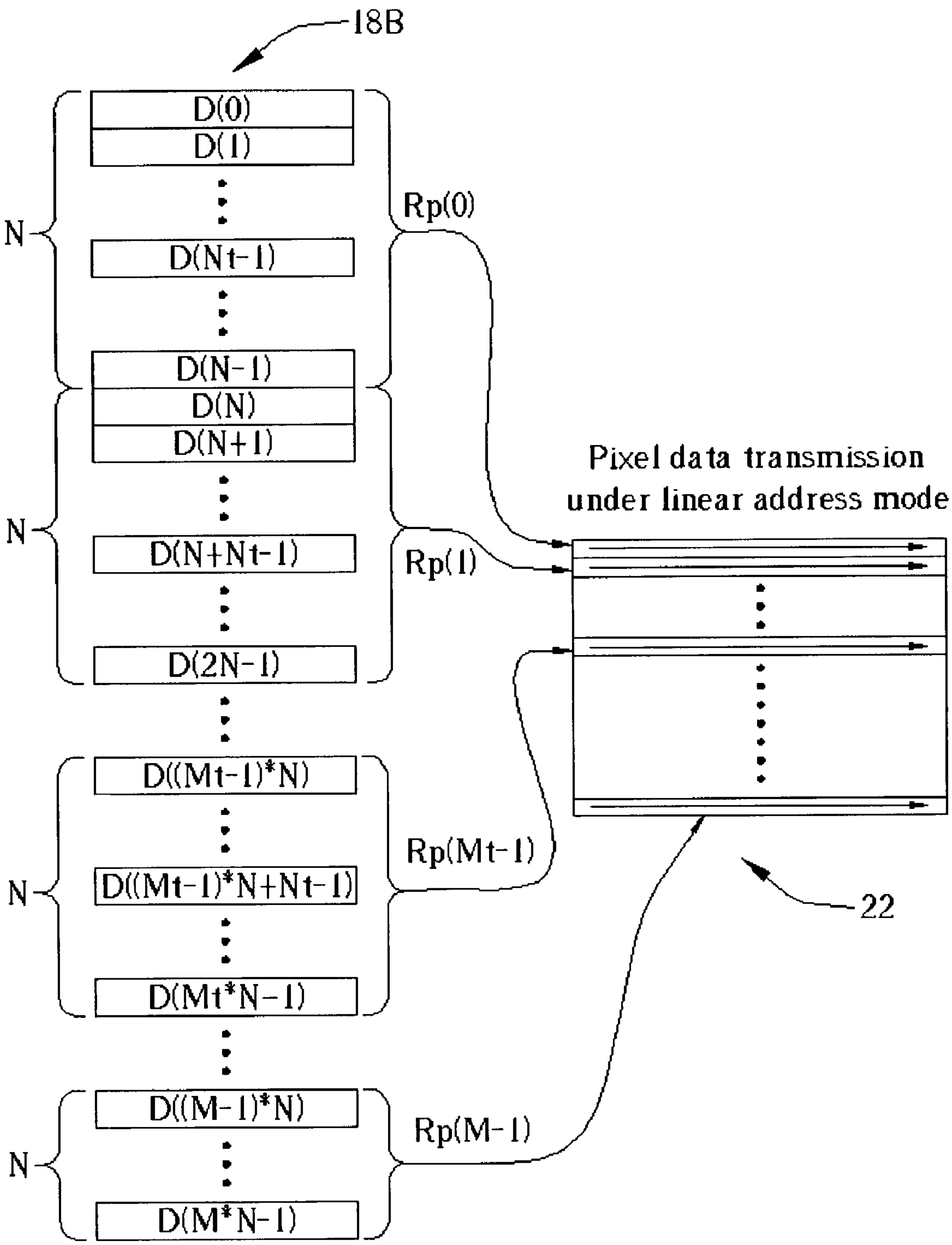
Fig. 3A Prior art
FIG. 3A and FIG. 3B are sequence diagrams of memory accessing, when transmitting pixel data and processing an image under a linear address mode according to the prior art.
Figure 3B:
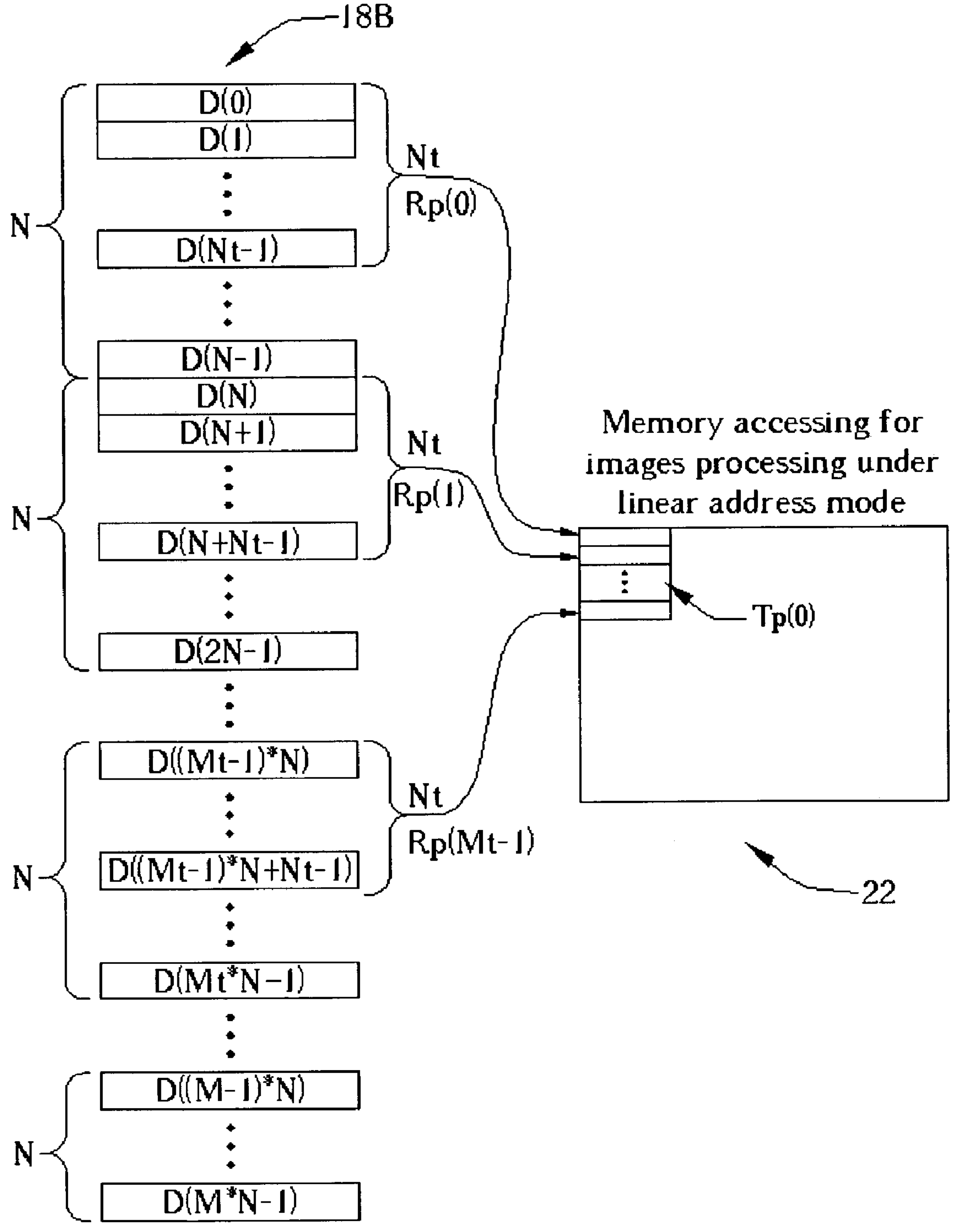
Fig. 3B Prior art
Figure 4A:
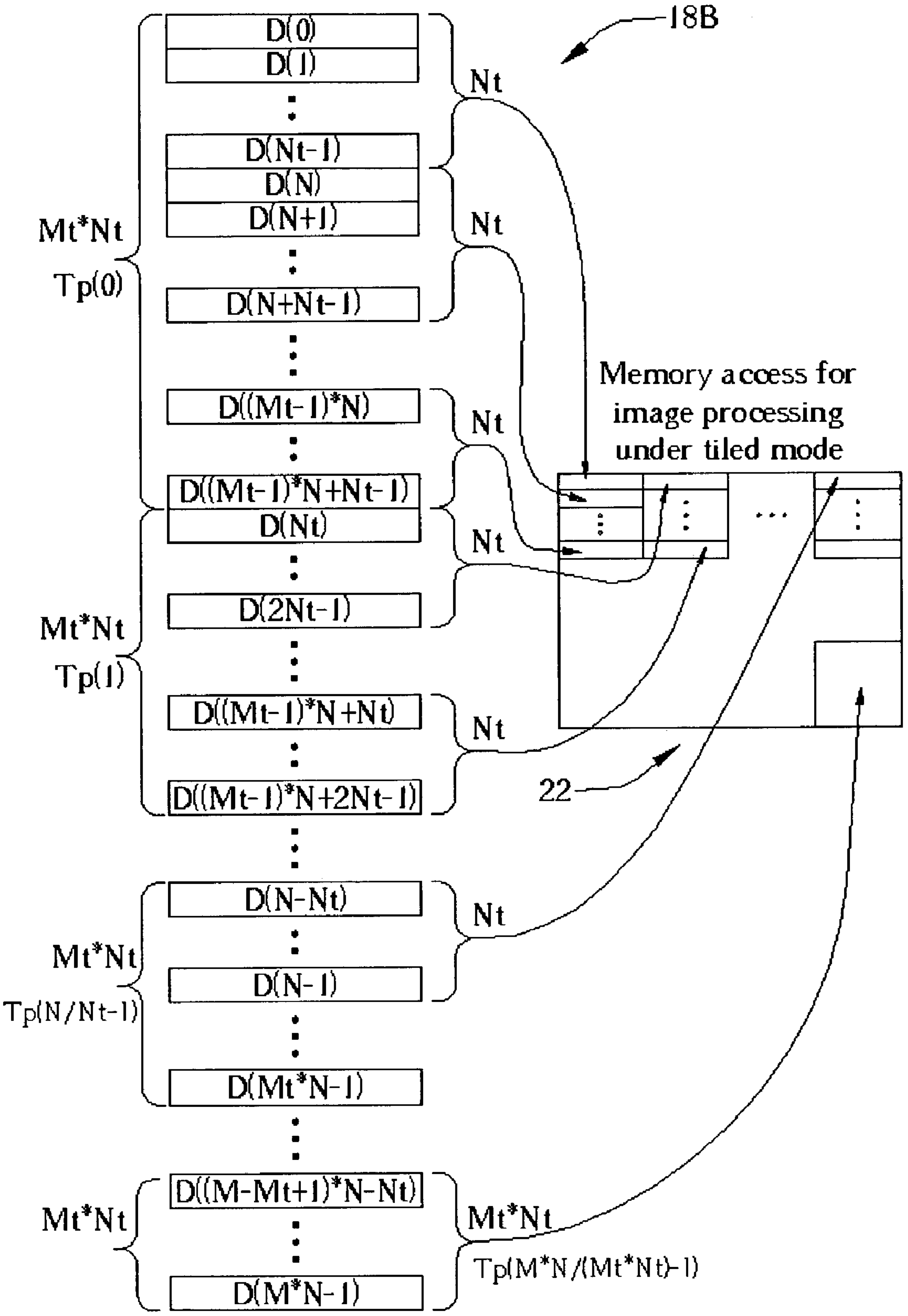
Fig. 4A Prior art
FIG. 4A and FIG. 4B are sequence diagrams of memory accessing, when transmitting pixel data and processing an image under a tiled mode according to the prior art.
Figure 4B:
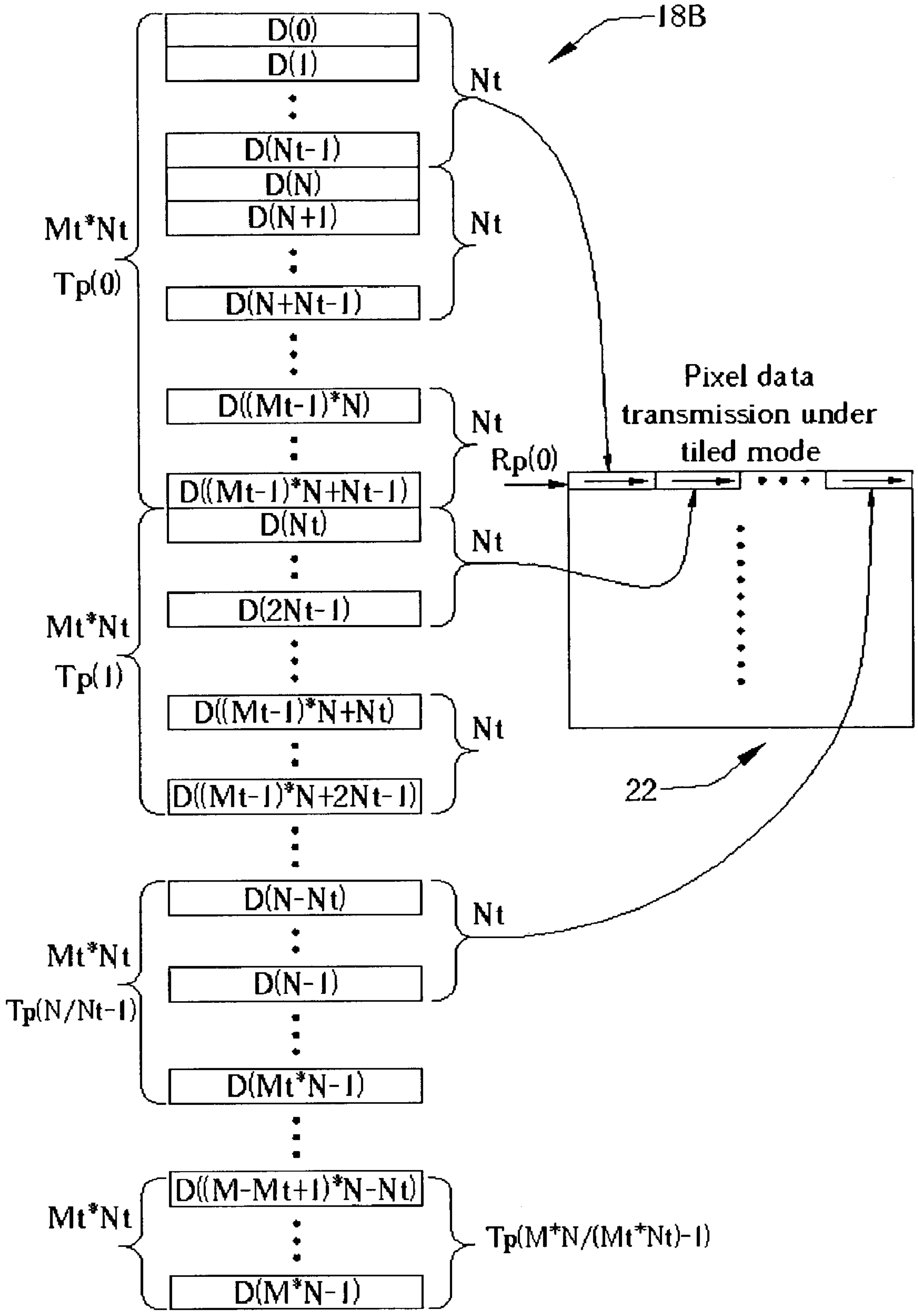
Fig. 4B Prior art
Figure 5:
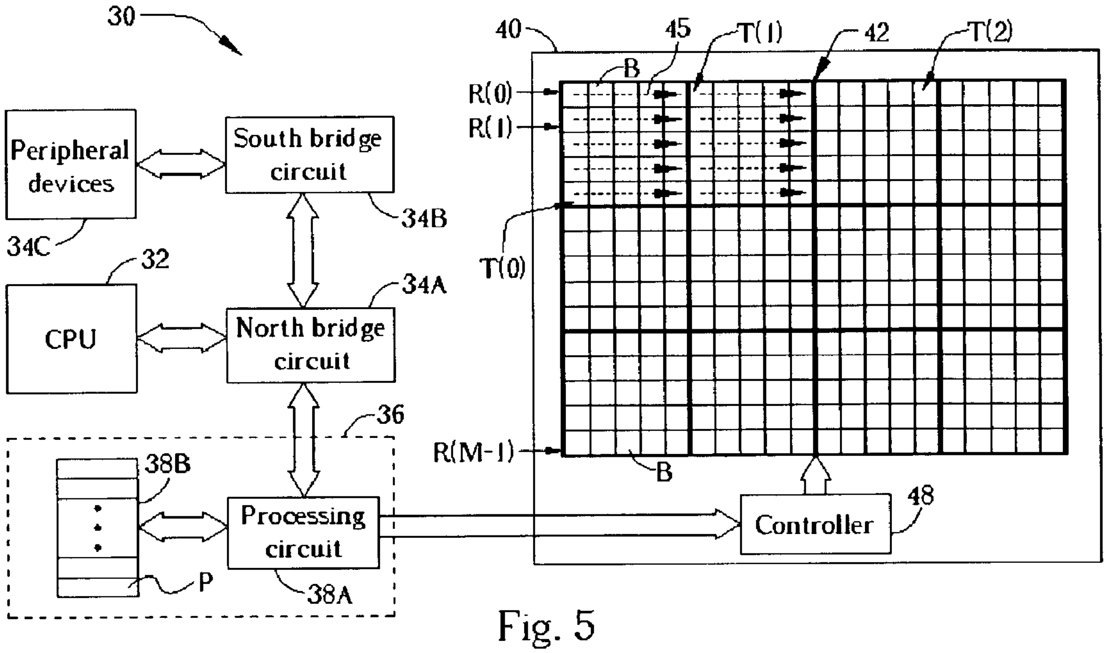
FIG. 5 is a functional block diagram of a computer system according to the present invention.

Please refer to FIG. 5. FIG. 5 is a functional block diagram of a computer system 30 according to the present invention. The computer system 30 comprises a central processing unit 32, a northbridge circuit 34A, a southbridge circuit 34B, peripheral devices 34C, a graphics card 36, and a monitor 40. The central processing unit 32 controls the operation of the computer system 30. The north bridge circuit 34A controls data transmission between the central processing unit 32 and the graphics card 36. The southbridge circuit 34B is to control data flow between the CPU 32 and peripheral devices 34C through the intermediate northbridge circuit 34A. The peripheral devices can be input devices (keyboard, mouse, etc) and storage devices (CD-ROM, HDD, etc). The CPU 32, northbridge 34A, south bridge 34B, and graphics card 36 can be mounted in a same motherboard. Some chipset developers have a processing unit 38A of the graphics card 36 integrated into the northbridge 34A, and a memory 38B of the graphics card 36 incorporated with a system memory. In the monitor 40, a main display area 42 comprises a plurality of display units B arranged in columns and rows as a matrix, and a controller 48 to control these display units B. The processing circuit 38A sends pixel data of the memory 38B to the controller 48, then according to the this pixel data, the controller 48 controls the display units B of the main display area 42 to display images in a fixed sequence.

One of the key parts of the present invention is the controller 48 that controls a display of an image through units of tiles. As is shown in FIG. 5, the main display area 42 is divided into several smaller portions, each of them is composed of a plurality of adjacent display units arranged as a matrix with columns and the rows having sizes less than the size of the main display area. In the present invention, each of these portions is a tile. The controller 48 controls all the display units of each tile to display pixel data in sequence. The example in FIG. 5 illustrates that the controller 48 first controls 5 display units of the row R(0), and then controls 5 display units of the row R(1), and so on. When the 5*5 array of display units of the tile are displaying the image, the controller 48 proceeds to another 5*5 array of display units of a next tile. This is repeated until all the display units B of the main display area 42 are displaying the image.

Figure 6:
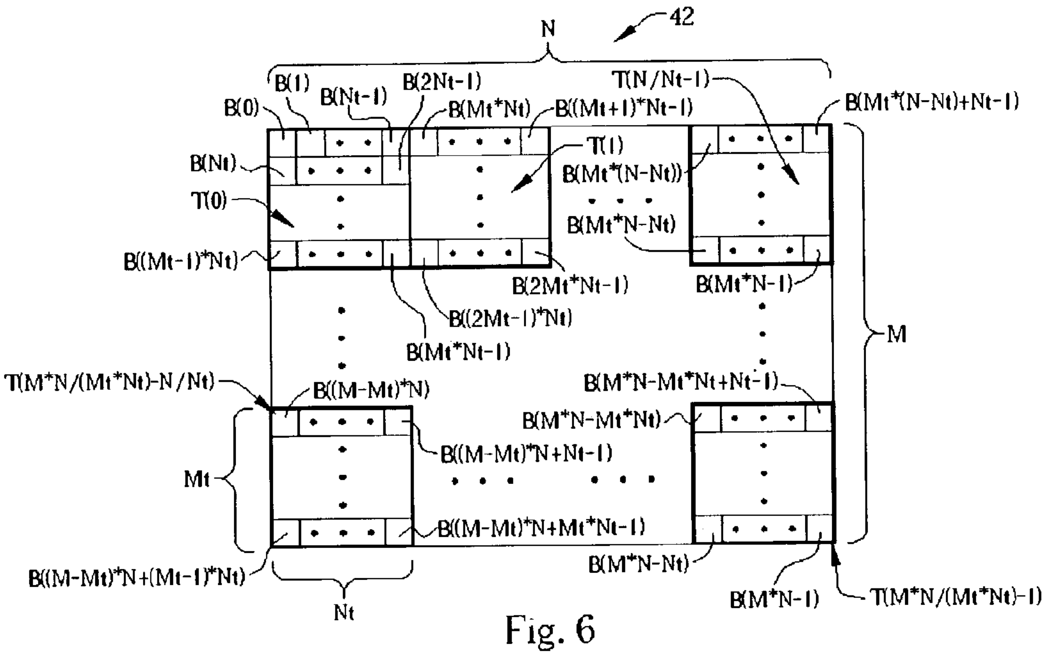
FIG. 6 is a sequence diagram of the controller of the monitor of FIG. 5 controlling display units.

Please refer to FIG. 6, which is a sequence diagram of the monitor 40 controlling the display units B according to the present invention. In this case, it is assumed that the main display area 42 comprises M rows and N columns of display units B, and a tile comprises Mt rows and Nt,columns of display units B. To more clearly indicate a sequence of the controller 48 controlling the display units B, the bracketed numbers in FIG. 6 represent the sequence of controlling the display units B. As is shown in FIG. 6, the controller 48 first controls the display units B(0), B(1) to B(Nt−1) in a tile T(0), and then the second row of display units B(Nt) to B(2Nt−1) of the tile T(0) to display images. Finally, the controller 48 controls the B(M*N−Mt*Nt) to B(M*N−Mt*Nt+Nt−1) of the all M*N display units in the main display area 42, after which the complete image is finished being displayed.

Figure 7:
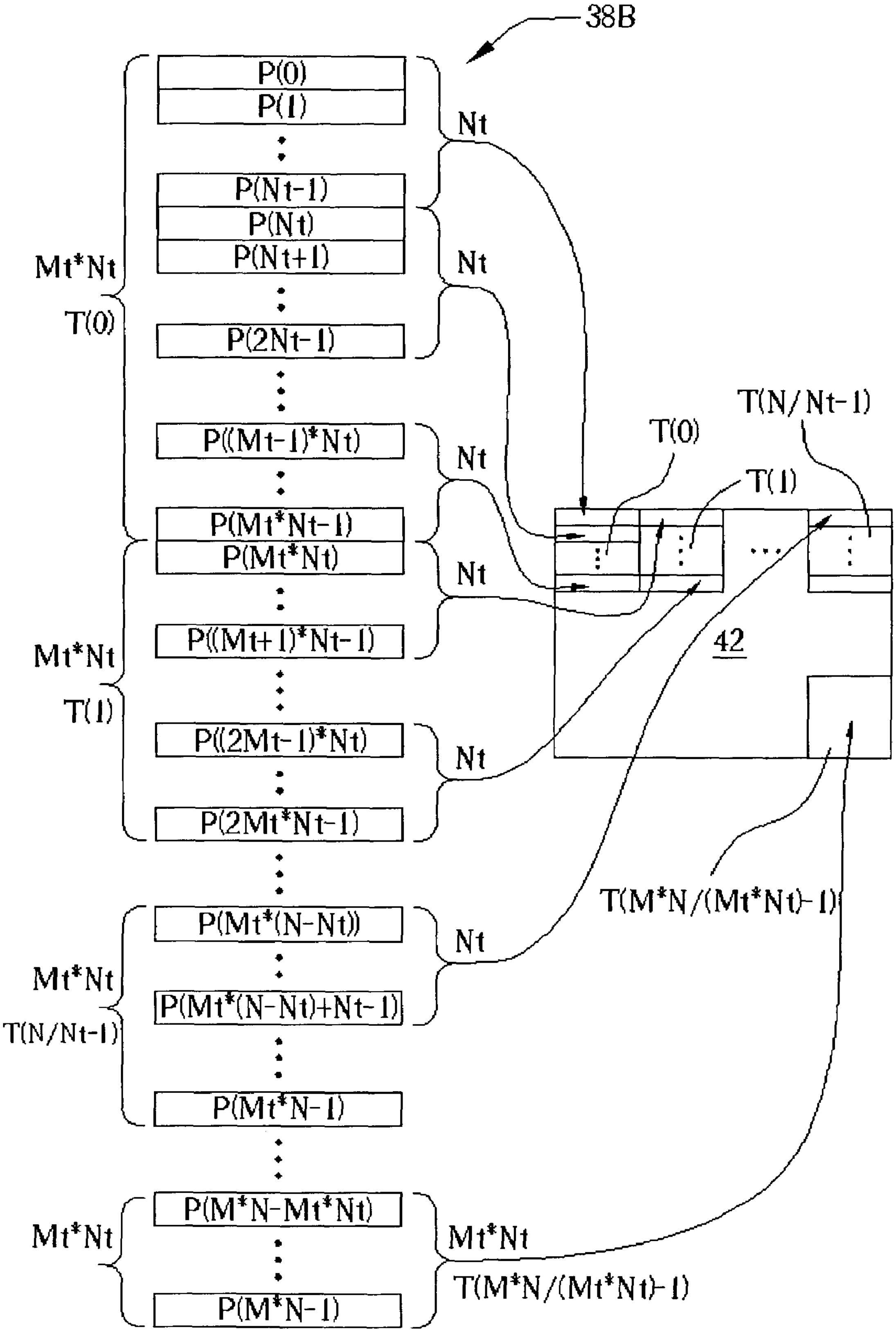
FIG. 7 is a schematic diagram of a memory allocation of the memory of FIG. 5.

Please refer to FIG. 7, which is a schematic diagram of a memory allocation of the memory 38B according to the present invention. The memory 38B comprises a plurality of memory units P, and each of the memory units P corresponds to a display unit B for storing the pixel data of the corresponding display unit B. To mark the corresponding display unit B of each memory unit P, bracketed numbers are adopted in FIG. 7, wherein memory unit P(m) corresponds to display unit B(m). In the present invention, all pixel data corresponding to display units B of a tile are stored adjacently in the memory unit 38B. As is shown in FIG. 7, Mt*Nt pixel data corresponding to the tile T(0) are stored in the sequentially arranged Mt*Nt memory units of the memory 38B. Therefore, the pixel data stored in first Nt memory units P(0) to P(Nt−1) correspond to the display units B(0) to B(Nt−1), and the pixel data stored in second Nt memory units P(Nt) to P(2Nt−1) correspond to the display units B(Nt) to B(2Nt−1), and so on. Further, Mt*Nt pixel data corresponding to the tile T(1) are stored sequentially after the pixel data corresponding to the tile T(0). And Mt*Nt pixel data corresponding to the last tile T(M*N/(Mt*Nt)−1) are stored in the last Mt*Nt memory units of the memory 38B.

As mentioned above, the processing circuit 38A accesses the pixel data in the memory 38B and executes image processing, and sequentially transmits the pixel data to the controller 48 according to the sequence the controller 48 controls the display units B. When image processing is in progress, the processing circuit 38A accesses the pixel data of the adjacent display units B of each tile, tile by tile, for conveniently processing the image. As is illustrated in FIG. 7, the plurality of pixel data of a tile in the present invention is stored over several adjacent memory units P. In this way, the processing circuit 38A can sequentially access all the pixel data of a tile sequentially for convenient image processing.

When the processing circuit 38A is transmitting the pixel data to the controller 48, since the controller 48 also controls the display tile by tile, the processing circuit 38A simply accesses the memory 38B according to the sequence that the controller 48 controls the display units, and thus the processing circuit 38B can transmit pixel data sequentially to the controller 48. As is shown in FIG. 7, first, the controller 48 controls the display units B of the tile T(0), then the processing circuit 38A simply sequentially reads the corresponding pixel data from the memory units P, and then sequentially transmits the pixel data to the controller 48. The controller 48 then proceeds to control the display units B of the tile T(1), then the processing circuit 38A reads sequentially and then transmits sequentially the pixel data to the controller 48 in the same manner.

To quantify the above-discussed advantages of the memory access according to the present invention consider the following example. Suppose that the main display area 42 comprises 1024*768 display units B, and a tile contains 32*32 display units B, then the main display area 42 has 32*24 tiles. Further suppose that a memory page contains 2048 memory units P, then according to the memory allocation illustrated in FIG. 7 of the present invention, a memory page is capable of storing pixel data corresponding to all the display units B of two tiles. Therefore, 384 (32*24/2) page misses occur when the processing circuit 38A is accessing the pixel data of each tile, and executing image processing tile by tile. Similarly, 384 (32*24/2) page misses occur when the processing circuit 38A transmits the pixel data to the controller 48 in the same sequence that the controller 48 controls the display of the pixel data. In contrast to the present invention, the prior art linear address mode has 12288 and 384 page misses respectively, and the prior art tiled mode has a 384 and 12288 page misses respectively. It is obvious that the present invention monitor 40 is capable of greatly reducing the loads put on the processing circuit 38A of the computer system 30.

In the prior art monitor 20, a row of display units is the unit by which the controller 24 controls all the display units. However, setting a tile as a unit is much more efficient when image processing. Therefore, high page misses inevitably occur at an extremely high rate when executing image processing and display control. The monitor 40 of the present invention is capable of controlling display units tile by tile, and then executing image processing tile by tile to efficiently process images. Therefore, the monitor 40 of the present invention can greatly reduce memory page misses and reduce the processing loads on the graphics card 36. This can reduce power consumption, and costs of design and production of the graphics card 36. Furthermore, the present invention can be applied to both CRT and LCD monitors.

Those skilled in the art will readily observe that numerous modifications and alternations of the computer system may be made while retaining the teachings of the invention. Accordingly, the above disclosure should be construed as limited only by the metes and bounds of the appended claims.

What is claimed is:

1. A computer system comprising:

a monitor comprising a main display area for displaying an image, the main display area having a plurality of display units arranged to be a matrix with a plurality of columns and rows, each display unit displaying a portion of the image according to corresponding pixel data, a plurality of the display units in the main display area being arranged to form matrix-like tiles with the number of rows of the tiles being less than the number of the rows of the display units in the main display area and the number of columns of the tiles being less than the number of the columns of the display units in the main display area;

a memory comprising a plurality of first sequential memory units and a plurality of second sequential memory units, the first sequential memory units for storing pixel data of display units forming a first tile, and the second sequential memory units for storing pixel data of display units not located in the first tile; and a processing unit for sequentially transmitting pixel data stored in the memory, wherein the processing unit transmits all pixel data stored in the first sequential memory units before transmitting pixel data stored in the second sequential memory units for processing pixel data one tile at a time.

2. The computer system of claim 1 wherein the monitor further comprises a controller electrically connected with the processing unit for transmitting pixel data from the processing unit to corresponding display units; wherein the controller is capable of transmitting a plurality of pixel data of the first sequential memory units to the display units of the first tile to make the plurality of the display units display a corresponding image.

3. The computer system of claim 1 wherein the memory and the processing unit are incorporated into a graphics card.

4. The computer system of claim 1 wherein the processing unit is integrated into a controller chip.

5. The computer system of claim 1 wherein the memory is a system memory.

6. The computer system of claim 1 wherein the memory and the processing unit are incorporated into a motherboard.

7. The computer system of claim 1 wherein the monitor is a Liquid Crystal Display.

8. The computer system of claim 1 wherein the processing unit is capable of sequentially reading pixel data from the memory for further video processing.

9. The computer system of claim 8 wherein the processing unit reads all pixel data from the first sequential memory units before reading pixel data from the second sequential memory units.

10. The computer system of claim 8 wherein the processing unit is capable of writing pixel data into the memory after the video is processed.

11. The computer system of claim 10 wherein the processing unit writes pixel data into all of the first sequential memory units before writing pixel data into the second sequential memory units.

* * * * *